US012652153B2

(12) United States Patent
Shimomura

(10) Patent No.: US 12,652,153 B2
(45) Date of Patent: Jun. 9, 2026

(54) BASE STATION FOR SWITCHING BETWEEN UPLINK PERIODS AND DOWNLINK PERIODS IN A TIME DIVISION MANNER

(71) Applicant: 1FINITY Inc., Kawasaki (JP)

(72) Inventor: Tsuyoshi Shimomura, Yokohama (JP)

(73) Assignee: 1FINITY Inc., Kawasaki (JP)

( * ) Notice: Subject to any disclaimer, the term of this patent is extended or adjusted under 35 U.S.C. 154(b) by 0 days.

(21) Appl. No.: 18/215,375

(22) Filed: Jun. 28, 2023

(65) Prior Publication Data

US 2023/0344613 A1      Oct. 26, 2023

Related U.S. Application Data

(60) Continuation of application No. 17/151,042, filed on Jan. 15, 2021, now Pat. No. 11,736,263, which is a
(Continued)

(51) Int. Cl.
*H04L 5/14*      (2006.01)
*H04W 72/20*      (2023.01)
(Continued)

(52) U.S. Cl.
CPC .............. *H04L 5/14* (2013.01); *H04W 72/20* (2023.01); *H04W 72/543* (2023.01); *H04W 88/08* (2013.01)

(58) Field of Classification Search
CPC .................................. H04L 5/14; H04W 72/20
See application file for complete search history.

(56) References Cited

U.S. PATENT DOCUMENTS 6,353,598 B1      3/2002   Baden et al.
2008/0137562 A1   6/2008   Li et al.
(Continued)

FOREIGN PATENT DOCUMENTS

EP          1 786 220 A1      5/2007
JP          2011-512097 A     4/2011
(Continued)

OTHER PUBLICATIONS

Decision of Refusal issued by the Japan Patent Office for corresponding Japanese Patent Application No. 2018-516302, mailed on Oct. 13, 2020, with a full English machine translation.
(Continued)

*Primary Examiner* — Sulaiman Nooristany
(74) *Attorney, Agent, or Firm* — Myers Wolin, LLC

(57)      ABSTRACT

A base station that switches between uplink periods and downlink periods in a time division manner and performs communication, the base station includes a memory; processor circuitry coupled to the memory, wherein the processor circuitry is configured to: notify of allocation information indicating a combination of resources for time division duplex (TDD) uplink (UL) or downlink (DL) configuration at a predetermined interval; and generate control information indicating cancelation of transmission of a downlink signal, wherein the canceled transmission is configured to be performed by using one of the resources designated by the allocation information, and wherein the processor circuitry is further configured to transmit the generated control information.

9 Claims, 13 Drawing Sheets

Related U.S. Application Data division of application No. 16/184,159, filed on Nov. 8, 2018, now Pat. No. 10,931,432, which is a continuation of application No. PCT/JP2016/064193, filed on May 12, 2016.

(51) Int. Cl.
    *H04W 72/543*      (2023.01)
    *H04W 88/08*      (2009.01)

(56) References Cited

U.S. PATENT DOCUMENTS

| | | | | |
|---|---|---|---|---|
| 2009/0201838 A1* | 8/2009 | Zhang | ................. | H04W 56/003 |
| | | | | 370/336 |
| 2009/0249153 A1 | 10/2009 | Zhang | | |
| 2011/0013581 A1 | 1/2011 | Lee et al. | | |
| 2013/0039193 A1 | 2/2013 | Yin et al. | | |
| 2013/0188516 A1 | 7/2013 | He et al. | | |
| 2014/0153454 A1 | 6/2014 | Samdanis et al. | | |
| 2014/0247801 A1 | 9/2014 | Oizumi et al. | | |
| 2014/0307591 A1 | 10/2014 | Wang et al. | | |
| 2015/0029989 A1 | 1/2015 | Shiizaki et al. | | |
| 2015/0078221 A1 | 3/2015 | Seo et al. | | |
| 2015/0110011 A1* | 4/2015 | Wei | ...................... | H04L 5/0053 |
| | | | | 370/329 |
| 2016/0080969 A1* | 3/2016 | Tseng | ................... | H04W 76/23 |
| | | | | 370/329 |
| 2016/0119920 A1 | 4/2016 | Mallik et al. | | |
| 2017/0012727 A1 | 1/2017 | Yasukawa et al. | | |
| 2018/0091269 A1* | 3/2018 | Ratilainen | ............. | H04W 72/54 |

FOREIGN PATENT DOCUMENTS

| | | | |
|---|---|---|---|
| JP | 2012-257321 A | 12/2012 |
| JP | 2014-522135 A | 8/2014 |
| JP | 2014-523725 A | 9/2014 |
| JP | 2015-504293 A | 2/2015 |
| JP | 2015-139108 A | 7/2015 |
| JP | 2015-518679 A | 7/2015 |
| KR | 10-2007-0050354 A | 5/2007 |
| KR | 10-2014-0135754 A | 11/2014 |
| WO | 2013/069218 A1 | 5/2013 |

OTHER PUBLICATIONS

Extended European search report with supplementary European search report and the European search opinion with Annex issued by the European Patent Office for corresponding European Patent Application No. 16901686.2, mailed on Mar. 18, 2019.

Notice of Preliminary Rejection issued by the Korean Intellectual Property Office for corresponding Korean Patent Application No. 10-2018-7034977, mailed on Apr. 10, 2020, with a full English translation.

Communication pursuant to Article 94(3) EPC issued by the European Patent Office for corresponding European Patent Application No. 16 901 686.2-1215, dated May 6, 2020.

Communication pursuant to Article 94(3) EPC issued by the European Patent Office for corresponding European Patent Application No. 16 901 686.2-1215, mailed on Dec. 18, 2019.

"Notice of Reasons for Refusal" issued by the Japanese Patent Office for corresponding application No. 2018-516302 dated Jun. 30, 2020, with full machine English translation.

Notice of Last Preliminary Rejection issued by Korean Intellectual Property Office for corresponding Korean Patent Application No. 10-2018-7034977, mailed on Oct. 23, 2020, with a full English translation.

Notice of Allowance issued by the United States Patent and Trademark Office for corresponding U.S. Appl. No. 16/184,159, electronically delivered on Nov. 12, 2020.

Final Office Action issued by the United States Patent and Trademark Office for corresponding U.S. Appl. No. 16/184,159, electronically delivered on Aug. 11, 2020.

Final Office Action issued by the United States Patent and Trademark Office for corresponding U.S. Appl. No. 16/184,159, electronically delivered on Nov. 12, 2019.

Non-Final Office Action issued by the United States Patent and Trademark Office for corresponding U.S. Appl. No. 16/184,159, electronically delivered on Mar. 10, 2020.

Non-Final Office Action issued by the United States Patent and Trademark Office for corresponding U.S. Appl. No. 16/184,159, electronically delivered on Jun. 7, 2019.

Status Report to TSG, "LTE Carrier Aggregation Enhancement Beyond 5 Carriers", Agenda Item:10.7.6, RP-160167 3GPP TSG RAN meeting #71, Goteborg, Sweden, Mar. 7-10, 2016.

International Search Report with Written Opinion of the International Searching Authority issued by the Japan Patent Office for corresponding International Patent Application No. PCT/JP2016/064193, mailed on Aug. 2, 2016, with an English translation.

Requirement for Restriction/Election issued by the United States Patent and Trademark Office for corresponding U.S. Appl. No. 16/184,159, electronically delivered on Feb. 13, 2019.

Second Notification of Office Action issued by the China National Intellectual Property Administration for corresponding Chinese Patent Application No. 201680085564.7, dated Feb. 7, 2022, with an English translation.

Notice of Reasons for Refusal issued by the Japan Patent Office for corresponding Japanese Patent Application No. 2021-002624, mailed on Oct. 4, 2022, with a full English machine translation.

Decision of Refusal issued by the Japan Patent Office for corresponding Japanese Patent Application No. 2021-002624, dated Feb. 28, 2023, with a full English machine translation.

Non-Final Office Action issued by the United States Patent and Trademark Office for corresponding U.S. Appl. No. 17/151,042, electronically delivered on Mar. 10, 2022.

Final Office Action issued by the United States Patent and Trademark Office for corresponding U.S. Appl. No. 17/151,042, electronically delivered on Jun. 3, 2022.

Non-Final Office Action issued by the United States Patent and Trademark Office for corresponding U.S. Appl. No. 17/151,042, electronically delivered on Feb. 8, 2023.

Notice of Allowance issued by the United States Patent and Trademark Office for corresponding U.S. Appl. No. 17/151,042, electronically delivered on Jun. 8, 2023.

* cited by examiner

| COMBINATION NUMBER | 0 | 1 | 2 | 3 | 4 |
|---|---|---|---|---|---|
| m | 9 | 7 | 5 | 3 | 1 |
| n | 1 | 3 | 5 | 7 | 9 |

BASE STATION FOR SWITCHING BETWEEN UPLINK PERIODS AND DOWNLINK PERIODS IN A TIME DIVISION MANNER

CROSS-REFERENCE TO RELATED APPLICATION

This application is a continuation application of U.S. application Ser. No. 17/151,042 filed on Jan. 15, 2021, which is a divisional application of U.S. application Ser. No. 16/184,159, filed Nov. 8, 2018, which is a continuation application of International Application PCT/JP2016/064193 filed on May 12, 2016, and designated the U.S., the entire contents of each are incorporated herein by reference.

FIELD

The present disclosure relates to a base station and a terminal.

BACKGROUND 5G (fifth generation mobile communication) has been examined as a communication standard of the next generation. In the 5G, support of many use cases roughly classified into eMBB (Enhanced Mobile BroadBand), Massive MTC (Machine Type Communications), and URLLC (Ultra-Reliable Low Latency Communication) is assumed. The 5G aims at improvement of frequency use efficiency while efficiently supporting ultralow delay communication data and normal data simultaneously in the same interface. For example, the eMBB aims at setting a delay of a user plane in an uplink channel and a downlink channel to 4 milliseconds. The URLLC aims at setting a delay of a user plane in an uplink channel and downlink channel to 0.5 millisecond.

In TDD-LTE (Time Division Duplex-Long Term Evolution), seven types of combinations (UL/DL configurations) of a subframe used for an uplink signal and a subframe used for a downlink signal are defined. A base station and a terminal perform communication based on a UL/DL configuration designated by the base station. In recent years, a technique for switching a UL/DL configuration at 10 milliseconds at the shortest in order to cope with sudden fluctuation in communication traffic involved in a reduction in a cell size has been introduced. Related arts are disclosed in, for example, Japanese National Publication of International Patent Application No. 2014-522135, International Publication Pamphlet No. WO2013/069218, and 3GPP RP-160167.

Incidentally, the communication traffic between the base station and the terminal often deviates to one of the uplink signal or the downlink signal. Therefore, communication is performed between the base station and the terminal using a UL/DL configuration deviating to one of the uplink signal or the downlink signal. Consequently, a large volume of data can be efficiently transmitted. However, if the UL/DL configuration deviates to one of the uplink signal and the downlink signal, when ultralow delay data occurs, transmission is put off to a period of a subframe used for transmission of the ultralow delay data. For example, when ultralow delay data occurs in the terminal, if a UL/DL configuration deviating to the downlink signal is used between the base station and the terminal, a waiting time to a subframe allocated to the uplink signal increases. Therefore, it is difficult to satisfy a delay requested to transmission of the ultralow delay data.

It is also conceivable to satisfy the delay requested to the transmission of the ultralow delay data by using a UL/DL configuration in which the uplink signal and the downlink signal are alternately transmitted. However, in this case, transmission efficiency concerning a large volume of data is deteriorated. In consideration of the situation, it is desirable that a delay requested to transmission of ultralow delay data is satisfied while maintaining transmission efficiency of a large volume of data.

SUMMARY

According to an aspect of the embodiments, a base station that switches between uplink periods and downlink periods in a time division manner and performs communication, the base station includes a memory; processor circuitry coupled to the memory, wherein the processor circuitry is configured to: notify of allocation information indicating a combination of resources for time division duplex (TDD) uplink (UL) or downlink (DL) configuration at a predetermined interval; and generate control information indicating cancelation of transmission of a downlink signal, wherein the canceled transmission is configured to be performed by using one of the resources designated by the allocation information, and wherein the processor circuitry is further configured to transmit the generated control information.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

BRIEF DESCRIPTION OF DRAWINGS

FIG. 3 illustrates an example of an allocation table;

FIG. 5 is a block diagram illustrating an example of a base station;

DESCRIPTION OF EMBODIMENTS

Figure 1:
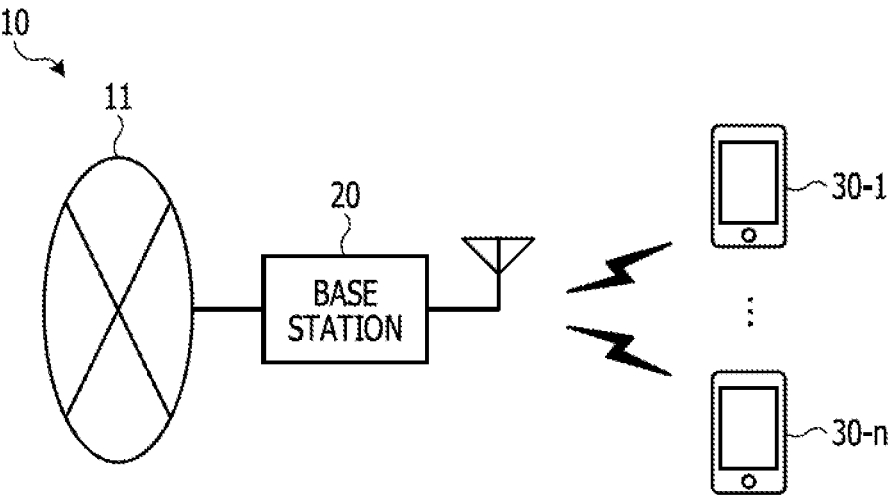
FIG. 1 illustrates an example of a wireless communication system.

An embodiment of a base station, a terminal, a wireless communication system, and a communication method disclosed by this application is explained in detail below with reference to the drawing. Note that the embodiment explained below does not limit the disclosed technique.

EMBODIMENT

[Wireless Communication System 10]

FIG. 1 illustrates an example of a wireless communication system 10.

The wireless communication system 10 includes a base station 20 and a plurality of terminals 30-1 to 30-n. Note that, in the following explanation, when the plurality of terminals 30-1 to 30-n are collectively referred to without being distinguished from one another, the plurality of terminals 30-1 to 30-n are simply described as terminals 30. In this embodiment, the base station 20 and the respective terminals 30 switch, in a time division manner, uplink signals transmitted from the respective terminals 30 to the base station 20 and downlink signals transmitted from the base station 20 to the respective terminals 30 and perform communication. The base station 20 and the respective terminals 30 perform communication based on, for example, a TDD-LTE (Time Division Duplex-Long Term Evolution) scheme.

The base station 20 and each terminals 30 perform transmission and reception of data not having a very high request concerning a delay but having a relatively large data amount (hereinafter described as large volume data) and transmission and reception of data having a high request concerning a delay but having a relatively small data amount (hereinafter described as ultralow delay data). The large volume data is data of a video, a file, and the like. The ultralow delay data is control signals and data transmitted and received in automatic drive of an automobile, remote surgery, and the like. Data other than the ultralow delay data such as the large volume data is an example of the first data. The ultralow delay data is an example of the second data.

Figure 2:
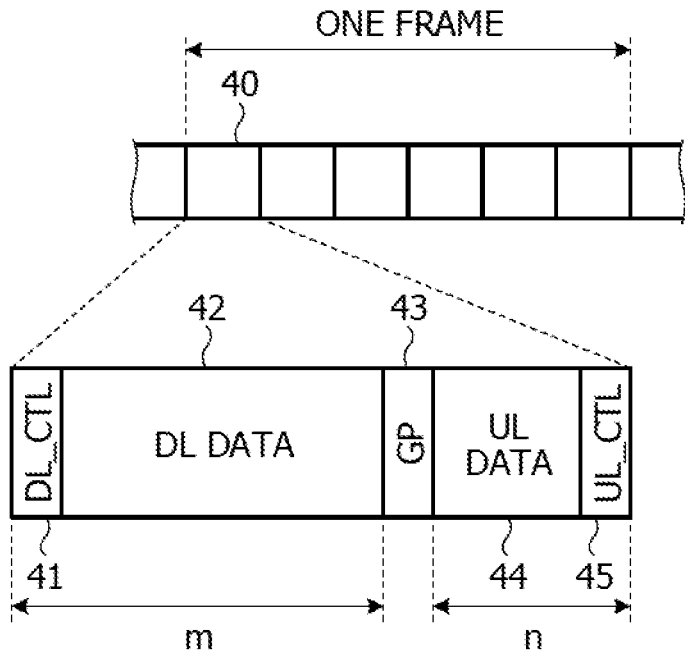
FIG. 2 illustrates an example of the structure of a frame.

In this embodiment, transmission and reception of data is performed using, for example, a frame having structure illustrated in FIG. 2 between the base station 20 and the respective terminals 30. FIG. 2 illustrates an example of the structure of the frame. For example, as illustrated in FIG. 2, a plurality of subframes 40 are included in one frame. Note that, in this embodiment, for example, as illustrated in FIG. 2, continuous six subframes 40 are included in one frame. However, the number of subframes included in one frame may be five or less or may be seven or more.

In each subframe 40, for example, as illustrated in FIG. 2, a region 41 to a region 45 are disposed in order from the head. The respective regions 41 to 45 are configured by a plurality of resource blocks specified by combinations of frequencies and times. The region 41 is a region where a control signal in a downlink direction, a reference signal used for demodulation of and the control signal in the downlink direction, and the like are disposed. The region 42 is a region where data in the downlink direction, a reference signal used for demodulation of the data in the downlink direction, and the like are disposed. The reference signals disposed in the region 41 and the region 42 are used, in the terminal 30, for measurement of the quality of a channel between the terminal 30 and the base station 20 as well.

The region 43 is a guard period. The region 44 is a region where data in an uplink direction, a reference signal used for demodulation of the data in the uplink direction, and the like are disposed. The region 45 is a region where a control signal in the uplink direction, a reference signal used for demodulation of the control signal in the uplink direction, and the like are disposed. In the following explanation, a signal disposed in the region 41 is described as DL_CTL, a signal disposed in the region 42 is described as DL data, the region 43 is described as GP, a signal disposed in the region 44 is described as UL data, and a signal disposed in the region 45 is described as UL_CTL.

In the example illustrated in FIG. 2, signals in the downlink direction are disposed in the region 41 and the region 42 and signals in the uplink direction are disposed in the region 44 and the region 45. For example, as illustrated in FIG. 2, in each subframe 40, when the length of a region where a signal in the downlink direction is disposed is represented as m and the length of a region where a signal in the uplink direction is disposed is represented as n, a ratio of an uplink signal and a downlink signal in each subframe 40 is represented by a combination of m and n. The region where the signal in the downlink direction is disposed is an example of the downlink section. The length m of the region where the signal in the downlink direction is disposed is an example of the information indicating the length of the downlink period. The region where the signal in the uplink direction is disposed is an example of the uplink period. The length n of the region where the signal in the uplink direction is disposed is an example of the information indicating the length of the uplink period.

In this embodiment, several kinds of ratios of uplink signals and downlink signals in each subframe 40 are decided in advance. FIG. 3 illustrates an example of an allocation table 50. In this embodiment, for example, as illustrated in the allocation table 50 in FIG. 3, five kinds of ratios of uplink signals and downlink signals in each subframe 40 are decided in advance. Note that combinations decided in advance as ratios of uplink signals and downlink signals in each subframe 40 may be four kinds or less or may be six kinds or more.

For example, in the allocation table 50 illustrated in FIG. 3, when a combination number is "0", a ratio of a downlink signal and an uplink signal in the subframe 40 is 9:1. In the subframe 40 in which the ratio of the downlink signal and the uplink signal is 9:1, for example, the region 45 where the UL_CTL is disposed is provided in a region where the uplink signal is disposed. However, the region 44 where UL data is disposed is not provided.

For example, when the combination number is "1" to "3", the region 42 where the DL data is disposed and the region 44 where the UL data is disposed are provided in the subframe 40. For example, when the combination number is "4", a ratio of a downlink signal and an uplink signal in the subframe 40 is 1:9. In the subframe 40 in which the ratio of the downlink signal and the uplink signal is 1:9, the region 41 where the DL_CTL is disposed is provided in a region where the downlink signal is disposed. However, the region 42 where the DL data is disposed is not provided. In the allocation table in FIG. 3, when the combination number is any one of "0" to "4", the region 41 where the DL_CTL is disposed, the region 43 of the GP, and the region 45 where the UL_CTL is disposed are provided in each subframe 40. Note that a combination of subframes not including a region of an uplink signal at all, a combination of subframes not including a region of a downlink signal at all, or a combination of subframes (Muting subframes) not including a region of an uplink signal and a region of a downlink signal may be included combinations that can be allocated.

Note that, in this embodiment, in each subframe 40, the region 41 to the region 45 are disposed in order from the head of the subframe 40. However, the order of the region 41 to the region 45 is not limited to the example illustrated in FIG. 2. For example, in each subframe 40, the region 41 and the region 42 may be disposed in the opposite order and the region 44 and the region 45 may be disposed in the opposite order. For example, in each subframe 40, the region 43 to the region 45 may be disposed further on the head side in the subframe 40 than the region 41 and the region 42.

Figure 4:
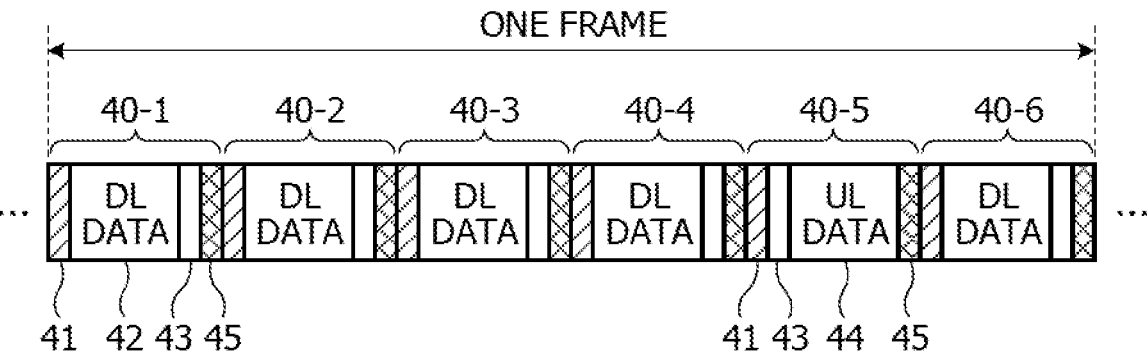
FIG. 4 illustrates an example of a combination of subframes included in one frame.

In this embodiment, the base station 20 creates allocation information for designating, in frame units, a combination of ratios of uplink signals and downlink signals in each subframe 40 and notifies the created allocation information to each terminal 30. The allocation information is notified to each terminal 30 using a channel such as a BCH (Broadcast CHannel) or a PDCCH (Physical Downlink Control CHannel). For example, when the allocation information created by the base station 20 is {0, 0, 0, 0, 4, 0}, the base station 20 and each terminal 30 communicate using, for example, a frame configured by six subframes 40 illustrated in FIG. 4. FIG. 4 illustrates a combination of subframes included in one frame. In FIG. 4, subframes 40-1 to 40-6 are disposed in order from the head of the frame.

When the allocation information is {0, 0, 0, 0, 4, 0}, for example, as illustrated in FIG. 4, the region 42 where the DL data is disposed is provided in the subframes 40-1 to 40-4 and the subframe 40-6. However, the region 44 where the UL data is disposed is not provided. On the other hand, in the subframe 40-5, the region 44 where the UL data is disposed is provided. However, the region 42 where the DL data is disposed is not provided.

In this way, the base station 20 decides the several kinds of combinations of ratios of uplink signals and downlink signals in each subframe 40 in advance and notifies, to each terminal 30, allocation information designating a combination used in communication. Consequently, flexibility of a combination of rations of uplink signals and downlink signals in each subframe 40 is improved. A data amount in notifying a combination of ratios of uplink signals and downlink signals in each subframe 40 to each terminal 30 can be reduced.

In this embodiment, in each subframe 40, the region 41 where the DL_CTL is disposed and the region 45 where the UL_CTL is disposed are provided. Consequently, the base station 20 and each terminal 30 can transmit a control signal to the counter apparatuses at least in each subframe 40. Therefore, the base station 20 and each terminal 30 can reduce a waiting time from time when data to be transmitted occurs until transmission of the data is started.

In this embodiment, when ultralow delay data occurs in the terminal 30, the terminal 30 notifies a transmission request for the ultralow delay data to the base station 20 using the region 45 used for a control signal in the uplink direction in the nearest subframe 40. In the following explanation, the transmission request for the ultralow delay data is described as L-SR (Scheduling Request for Low latency communications). Note that a plurality of resources used for transmission of the L-SR are disposed for each terminal 30 in the region 45 used for the control signal in the uplink direction.

When receiving the L-SR from the terminal 30, the base station 20 detects the occurrence of the ultralow delay data. The base station 20 allocates a resource for the ultralow delay data to the region 44 where the UL data is disposed in the subframe 40 two subframes after the subframe 40 in which the L-SR is transmitted. In the following explanation, the subframe 40 in which the L-SR is transmitted is described as first subframe 40 and the subframe 40 used for the transmission of the ultralow delay data is described as second subframe 40.

The base station 20 disposes a switching instruction for the terminal 30 at the transmission source of the L-SR in the region 41 where the DL_CTL is disposed in the second subframe 40. An instruction for switching a resource in the second subframe 40 to a resource for the ultralow delay data, information concerning the resource switched for the ultralow delay data, and the like are included in the switching instruction. Note that an instruction itself to perform the switching of the resource does not have to be explicitly transmitted. The instruction itself to perform the switching may be implicitly notified by notifying resource information for the ultralow delay data to the terminal 30 or notifying permission concerning the transmission of the ultralow delay data using a predetermined resource. By differentiating, in advance, a transmission format or a transmission resource of resource allocation information of the ultralow delay data from a transmission format or a transmission resource for data, which is not the ultralow delay data, the base station 20 may inform the terminal 30 whether the instruction is an instruction related to the ultralow delay data (that is, an instruction more preferential than a combination of ratios of uplink signals and downlink signals notified in advance) or an instruction based on the combination of ratios of uplink signals and downlink signals notified in advance.

After transmitting the L-SR, the terminal 30 monitors the region 41 in each subframe 40. When a switching instruction addressed to the terminal 30 is disposed in the region 41, the terminal 30 transmits, according to the switching instruction, the ultralow delay data to the base station 20 using the resource allocated for the ultralow delay data in the region 44 where the UL data is disposed. Consequently, even when a ratio of a downlink signal is set higher than a ratio of an uplink signal in each subframe 40 in order to increase a throughput of the large volume data, the terminal 30 can quickly start transmission of the occurred ultralow delay data. Consequently, the wireless communication system 10 in this embodiment can satisfy a delay requested to the transmission of the ultralow delay data while maintaining transmission efficiency of the large volume data.

[Base Station 20]

Figure 5:
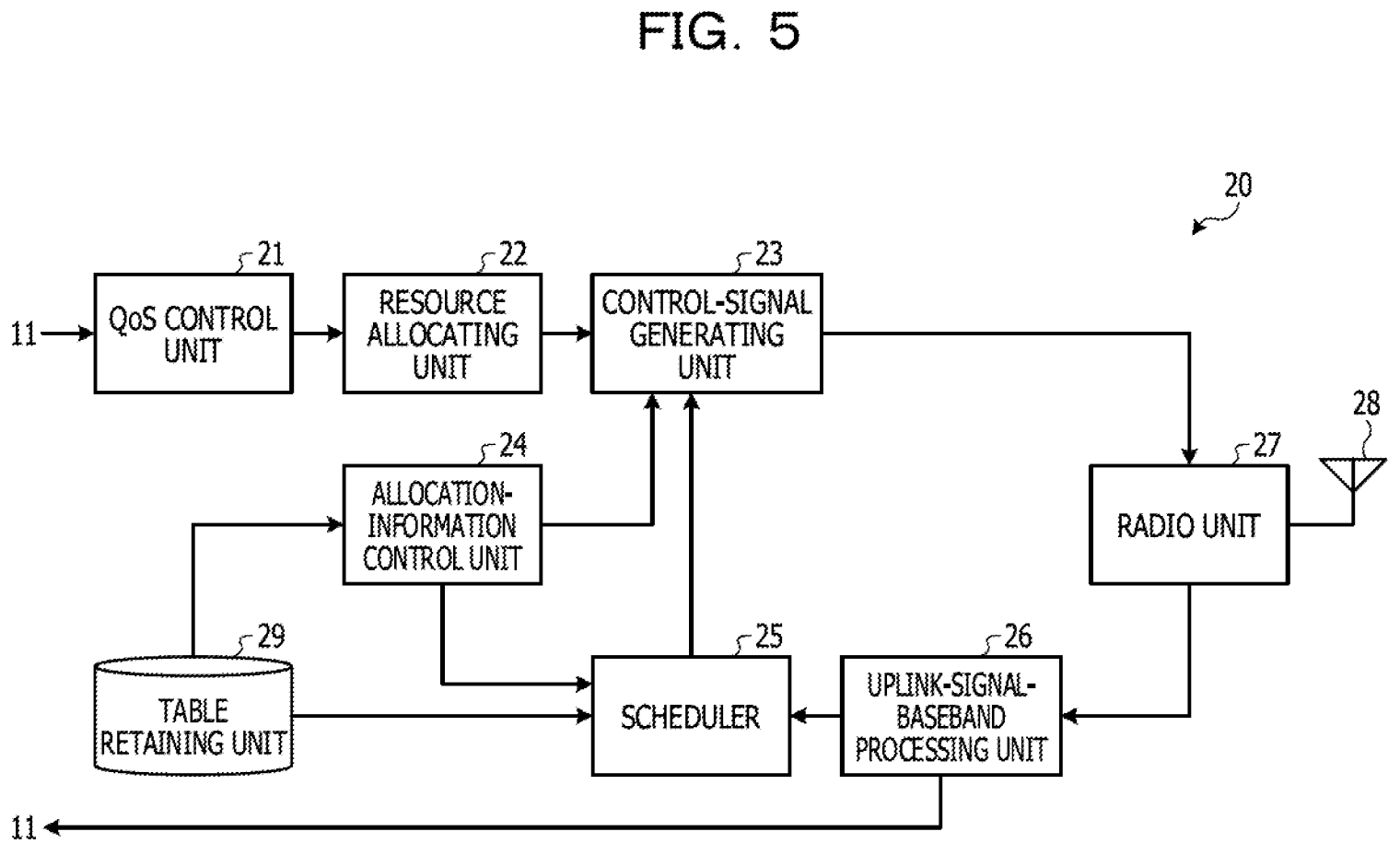

FIG. 5 is a block diagram illustrating an example of the base station 20. The base station 20 includes, for example, as illustrated in FIG. 5, a QoS (Quality of Service) control unit 21, a resource allocating unit 22, a control-signal generating unit 23, and an allocation-information control unit 24. The base station 20 includes, for example, as illustrated in FIG. 5, a scheduler 25, an uplink-signal-baseband processing unit 26, a radio unit 27, an antenna 28, and a table retaining unit 29. Note that, in FIG. 5, among functional blocks included in the base station 20, blocks concerning transmission of a control signal in the downlink direction and blocks concerning reception of a control signal and data in the uplink direction are illustrated. The control-signal generating unit 23 is an example of the notifying unit. The scheduler 25 is an example of the creating unit.

The radio unit 27 executes, on a control signal output from the control-signal generating unit 23, processing such as conversion from a digital signal into an analog signal and upconvert and generates a transmission signal. The radio unit 27 transmits the generated transmission signal via the antenna 28. The radio unit 27 executes, on a signal received from the terminal 30 via the antenna 28, processing such as downconvert and conversion from an analog signal into a digital signal and generates a reception signal. The radio unit 27 outputs the generated reception signal to the uplink-signal-baseband processing unit 26.

The QoS control unit 21 receives, from an MME (Mobility Management Entity) or the like in a core network 11, a delay condition, communication speed, and the like requested to services provided to the terminal 30. Services for treating ultralow delay data such as automatic drive of an automobile and remote surgery, services for treating large volume data such as a video and a file, and the like are included in the services provided to the terminal 30. The QoS control unit 21 determines, based on the delay condition, the communication speed, and the like, whether resources used for the L-SR are prepared for the terminal 30 to which the service is provided. When determining that the resources used for the L-SR are prepared, the QoS control unit 21 instructs the resource allocating unit 22 to allocate the resources used for the L-SR.

The resource allocating unit 22 allocates the resources used for the L-SR, according to the instruction from the QoS control unit 21, to the terminal 30. The resource allocating unit 22 outputs transmission request information indicating the allocation of the resources used for the L-SR to the control-signal generating unit 23. The resource allocating unit 22 allocates, for example, for each of the subframes 40, the resource of the L-SR to the region 41 of the DL_CTL in the subframe 40. Note that resources used for a transmission request of data other than the ultralow delay data such as large volume data are allocated to the region 41 of the DL_CTL in the subframe 40 at a time interval longer than a time interval of the L-SR.

In this embodiment, the resource allocating unit 22 allocates the resources used for the L-SR and the resources used for the transmission request for the data other than the ultralow delay data to separate resources. However, the disclosed technique is not limited to this. The resource allocating unit 22 may allocate the resources used for the L-SR and the resources used for the transmission request for the data other than the ultralow delay data to the same resource for each of the terminals 30. In this case, the L-SR and the transmission request for the data other than the ultralow delay data are distinguished by content of data included in the transmission request. For example, the L-SR and the transmission request for the data other than the ultralow delay data are distinguished according to a value of a specific flag included in the transmission request.

The table retaining unit 29 retains, for example, the allocation table 50 illustrated in FIG. 3. The allocation-information control unit 24 determines a ratio of an uplink signal and a downlink signal in each subframe 40 in one frame according to a state of communication traffic between the base station 20 and each terminal 30 (for example, a type and an amount of data transmitted and received between the base station 20 and each terminal 30). The allocation-information control unit 24 refers to the allocation table 50 in the table retaining unit 29 and selects a combination number corresponding to the determined ratio. The allocation-information control unit 24 outputs the selected combination number to the control-signal generating unit 23 and the scheduler 25 as allocation information in frame units.

The uplink-signal-baseband processing unit 26 performs processing such as demodulation and decoding on the reception signal output from the radio unit 27 and extracts a control signal and reception data. The uplink-signal-baseband processing unit 26 outputs the control signal to the scheduler 25 and outputs the reception data to the core network 11.

The scheduler 25 determines, based on the control signal output from the uplink-signal-baseband processing unit 26, whether the L-SR is received. When the L-SR is received, the scheduler 25 detects occurrence of ultralow delay data. The scheduler 25 specifies, as a second subframe 40 used for transmission of the ultralow delay data, for example, the subframe 40 two subframes after the first subframe 40 to which the L-SR is transmitted. Note that the scheduler 25 may specify, as the second subframe 40, the subframe 40 three or more subframes after the first subframe 40 according to a processing ability or the like of the terminal 30. However, to reduce a transmission delay of the ultralow delay data, it is desirable to specify, as the second subframe 40, the subframe 40 close to the first subframe 40.

The scheduler 25 determines whether the specified second subframe 40 is a changeable subframe 40. In this embodiment, a change is prohibited concerning the subframe 40 including data, transmission timing of which is important, such as a synchronization signal and important system information. When the second subframe 40 is the changeable subframe 40, the scheduler 25 refers to the allocation information output from the allocation-information control unit 24 and the allocation table 50 in the table retaining unit 29. The scheduler 25 determines whether the region 44 of the UL data is included in the second subframe 40. When the region 44 of the UL data is included in the second subframe 40, the scheduler 25 determines whether the region 44 of the UL data included in the second subframe 40 has a size sufficient for disposing the ultralow delay data. In this embodiment, a data amount of the ultralow delay data transmitted at one time is determined in advance. Note that the data amount of the ultralow delay data transmitted at one time may be any data amount. However, in that case, information indicating the data amount of the ultralow delay data is included in the L-SR.

When the region 44 of the UL data included in the second subframe 40 has the size sufficient for disposing the ultralow delay data, the scheduler 25 creates a switching instruction including an instruction for switching a resource in the second subframe 40 to a resource for the ultralow delay data. Information indicating a resource allocated to transmission of the ultralow delay data in the region 44 of the UL data included in the second subframe 40 is included in the switching instruction. Besides information indicating a combination of a frequency and time allocated to transmission of data, information for designating transmission power, an MCS (Modulation and Coding Scheme), and the like is included in the information indicating the resource allocated to the transmission of the ultralow delay data. The switching instruction is transmitted to the terminal 30 at the transmission source of the L-SR using a channel in the downlink direction such as the PDCCH.

When a resource in the region 44 of the UL data before being switched to a resource for transmission of the ultralow delay data is allocated to transmission of the UL data of the terminal 30, the scheduler 25 creates a suspension instruction for instructing the terminal 30 to suspend the transmission of the UL data. The suspension instruction is transmitted to, using a channel in the downlink direction such as the PDCCH, the terminal 30 to which the resource in the region 44 of the UL data before being switched to the resource for the transmission of the ultralow delay data is allocated. The terminal 30 that receives the suspension instruction suspends transmission of data scheduled to be transmitted using the resource in the region 44 of the UL data before being switched to the resource for the transmission of the ultralow delay data.

When the region 44 of the UL data is not included in the second subframe 40 or when the region 44 of the UL data of the second subframe 40 does not have the size enough for disposing the ultralow delay data, the scheduler 25 performs determination explained below. That is, when at least a part of the region 42 of the DL data of the second subframe 40 is switched to the region 44 of the UL data, the scheduler 25 determines whether the region 44 having the size enough for disposing the ultralow delay data is secured. When the region 44 having the size enough for disposing the ultralow delay data is secured by the switching, the scheduler 25 creates a switching instruction including an instruction for switching at least a part of the region 42 of the DL data to a resource for the ultralow delay data.

When at least a part of the region 42 of the DL data is switched to the resource for the ultralow delay data, the scheduler 25 creates a change notification indicating that the region 42 of the DL data is changed to the resource for the ultralow delay data. The change notification is notified to each terminal 30 belonging to the base station 20 using a channel in the downlink direction such as the BCH. Consequently, the terminal 30 that measures the quality of the channel between the terminal 30 and the base station 20 based on the reference signal included in the region 42 of the DL data before being changed to the resource for the ultralow delay data can recognize that the content of the region 42 of the DL data is changed. Consequently, the terminal 30 can exclude, from a measurement target of the quality of the channel, the subframe 40 changed to the resource for the ultralow delay data. Therefore, the terminal 30 can stop deterioration in measurement accuracy of the quality of the channel due to the change of the region 42 of the DL data to the resource for the ultralow delay data.

When the transmission request information indicating the allocation of the resources used for the L-SR is output from the resource allocating unit 22, the control-signal generating unit 23 creates a control signal including the transmission request information. When the allocation information is output from the allocation-information control unit 24, the control-signal generating unit 23 creates a control signal including the allocation information. When the switching instruction, the suspension instruction, or the change notification is output from the scheduler 25, the control-signal generating unit 23 creates a control signal including these kinds of information. The control-signal generating unit 23 performs processing such as encoding and modulation on the created control signal. The control-signal generating unit 23 disposes a signal after the processing in the region 41 in the subframe 40 and outputs the signal to the antenna 28. The subframe 40 in which the control signal in the downlink direction is disposed is transmitted from the antenna 28 by the radio unit 27.

Figure 6:
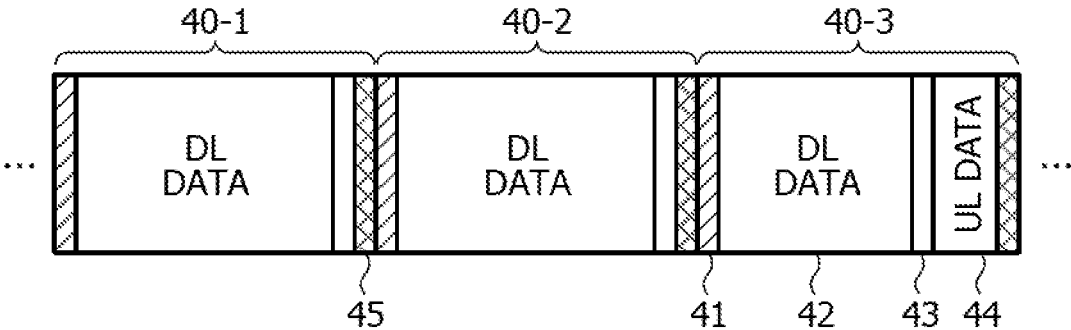
FIG. 6 is a diagram for explaining an example of transmission timings of an L-SR and ultralow delay data.
Figure 7:
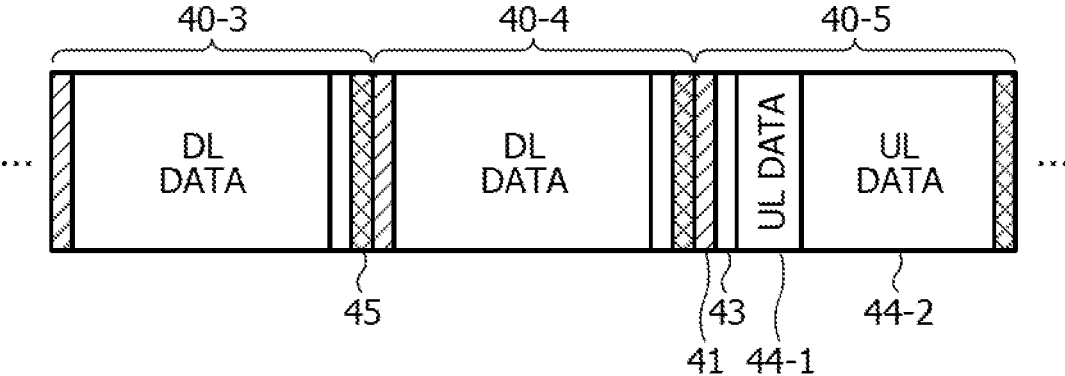
FIG. 7 is a diagram for explaining another example of the transmission timings of the L-SR and the ultralow delay data.

FIGS. 6 and 7 are diagrams for explaining an example of transmission timings of the L-SR and the ultralow delay data. In FIGS. 6 and 7, it is assumed that the subframes 40 in each frame are disposed, for example, as illustrated in FIG. 4. In FIGS. 6 and 7, it is assumed that a change is not prohibited in all the subframes 40.

For example, as illustrated in FIG. 6, when the L-SR is transmitted from the terminal 30 in the region 45 where the UL_CTL is disposed in the subframe 40-1, the scheduler 25 specifies, as the second subframe 40, the subframe 40-3 two subframes after the subframe 40-1. In the example illustrated in FIG. 4, the region 44 of the UL data is not included in the subframe 40-3. Therefore, the scheduler 25 switches a part of the region 42 of the DL data in the subframe 40-3 to the region 44 of the UL data including the resource for the ultralow delay data. The scheduler 25 creates a switching instruction including an instruction for switching a part of the region 42 of the DL data to the resource for the ultralow delay data and a change notification indicating that the region 42 of the DL data is changed to the resource for the ultralow delay data. The created switching instruction is disposed in the region 41 of the DL_CTL in the subframe 40-3 and transmitted to the terminal 30 at the transmission source of the L-SR. The created change notification is disposed in the region 41 of the CL_CTL in the subframe 40-3 and notified to each terminal 30.

The terminal 30 that receives the switching instruction transmits the ultralow delay data using the resource in the subframe 40-3 designated by the switching instruction. In this embodiment, the length of each subframe 40 is, for example, 100 to 150 microseconds. In the example illustrated in FIG. 6, the ultralow delay data is transmitted to the base station 20 within 450 microseconds after the occurrence of the ultralow delay data is detected in the terminal 30. Therefore, the wireless communication system 10 in this embodiment can start transmission of the ultralow delay data within 0.5 millisecond from the occurrence of the ultralow delay data.

For example, as illustrated in FIG. 7, when the L-SR is transmitted from the terminal 30 in the region 45 of the UL_CTL in the subframe 40-3, the scheduler 25 specifies, as the second subframe 40, the subframe 40-5 two subframes after the subframe 40-3. In the example illustrated in FIG. 4, the region 44 of the UL data is included in the subframe 40-5. However, the resource for the ultralow delay data with respect to the L-SR is not included in the region 44 of the UL data. Therefore, the scheduler 25 switches a part of resources in the region 44 of the UL data in the subframe 40-5 to a resource 44-1 for the ultralow delay data. Consequently, the resource 44-1 for the ultralow delay data and a resource 44-2 for data other than the ultralow delay data are included in the region 44 of the UL data in the subframe 40-5. Note that, when a part of the region 44 of the UL data is switched to the resource 44-1 for the ultralow delay data, it is desirable to switch a region on the head side in the region 44 to the resource 44-1 for the ultralow delay data. Consequently, it is possible to more quickly start the transmission of the ultralow delay data.

Note that, when a resource before being switched to the resource 44-1 for the ultralow delay data is already allocated to the terminal 30 as the resource for the data other than the ultralow delay data, the scheduler 25 creates a suspension instruction to the terminal 30. The created suspension instruction is disposed in the region 41 of the DL_CTL in the subframe 40-5 and transmitted to the terminal 30 to which the resource being switched to the resource 44-1 for the ultralow delay data is allocated.

[Terminal 30]

Figure 8:
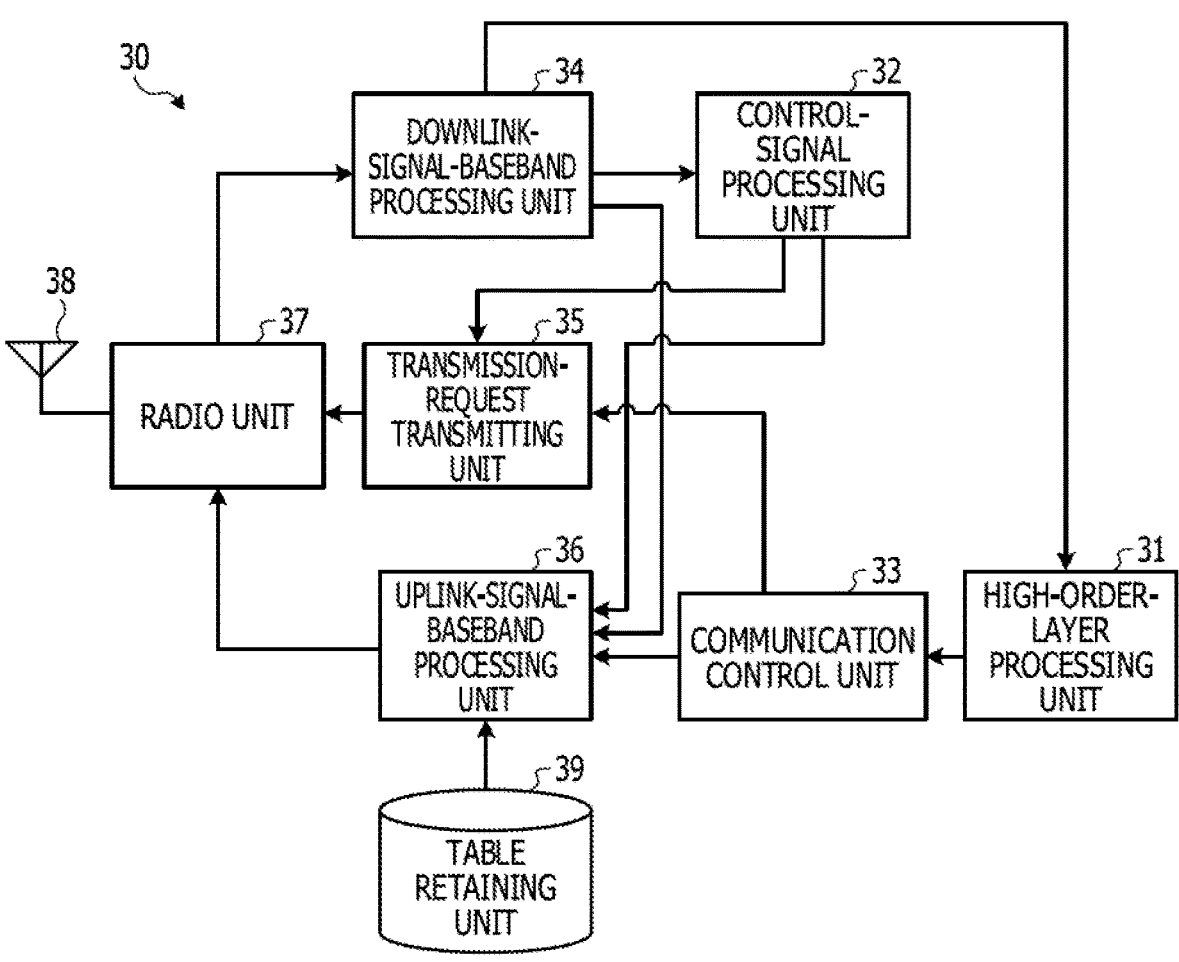
FIG. 8 is a block diagram illustrating an example of a terminal.

FIG. 8 is a block diagram illustrating an example of the terminal 30. The terminal 30 includes, for example, as illustrated in FIG. 8, a high-order-layer processing unit 31, a control-signal processing unit 32, a communication control unit 33, a downlink-signal-baseband processing unit 34, a transmission-request transmitting unit 35, an uplink-signal-baseband processing unit 36, a radio unit 37, an antenna 38, and a table retaining unit 39. The downlink-signal-baseband processing unit 34 and the uplink-signal-baseband processing unit 36 are examples of the communication unit. The control-signal processing unit 32 is an example of the receiving unit. The high-order-layer processing unit 31 is an example of the detecting unit. The transmission-request transmitting unit 35 is an example of the transmitting unit. The downlink-signal-baseband processing unit 34 is an example of the measuring unit.

The radio unit 37 executes, on signals output from the transmission-request transmitting unit 35 and the uplink-signal-baseband processing unit 36, processing such as conversion from a digital signal into an analog signal and upconvert and generates a transmission signal. The radio unit 37 transmits the generated transmission signal to the base station 20 via the antenna 38. The radio unit 37 performs, on a signal received from the base station 20 via the antenna 38, processing such as downconvert and conversion from the analog signal into the digital signal and outputs a signal after the processing to the downlink-signal-baseband processing unit 34.

The downlink-signal-baseband processing unit 34 estimates a channel based on the signal output from the radio unit 37, demodulates and decodes the signal output from the radio unit 37 using the estimated channel, and generates a reception signal. The downlink-signal-baseband processing unit 34 extracts reception data and a control signal from the reception signal, outputs the reception data to the high-order-layer processing unit 31, and outputs the control signal to the control-signal processing unit 32. Transmission request information, allocation information, a switching instruction, a suspension instruction, a change notification, and the like are included in the control signal.

The downlink-signal-baseband processing unit 34 measures the quality of the channel between the base station 20 and the terminal 30 based on the signal of each subframe 40 output from the radio unit 37. For example, the downlink-signal-baseband processing unit 34 measures the quality of the channel between the base station 20 and the terminal 30 using reference signals disposed in the region 41 and the region 42 in each subframe 40. The downlink-signal-baseband processing unit 34 creates a CQI (Channel Quality Indicator) indicating the measured quality of the channel and outputs the created CQI to the uplink-signal-baseband processing unit 36.

Note that, when the change notification indicating that the region 42 of the DL data is changed to the resource for the ultralow delay data is included in the control signal, the downlink-signal-baseband processing unit 34 excludes, from the measurement target of the quality of the channel, the subframe 40 changed to the resource for the ultralow delay data. Consequently, the downlink-signal-baseband processing unit 34 can stop deterioration in measurement accuracy of the quality of the channel due to the change of the region 42 of the DL data to the resource for the ultralow delay data.

When transmission request information addressed to the terminal 30 is included in the control signal output from the downlink-signal-baseband processing unit 34, the control-signal processing unit 32 outputs the transmission request information to the transmission-request transmitting unit 35. When allocation information, a switching instruction, and a suspension instruction addressed to the terminal 30 are included in the control signal output from the downlink-signal-baseband processing unit 34, the control-signal processing unit 32 outputs the allocation information, the switching instruction, and the suspension instruction to the uplink-signal-baseband processing unit 36.

The high-order-layer processing unit 31 executes peculiar processing of the terminal 30. The high-order-layer processing unit 31 executes processing for treating ultralow delay data of, for example, automatic drive of an automobile and remote surgery, processing for treating large volume data such as a video and a file, and the like. When data to be transmitted to the base station 20 occurs, the high-order-layer processing unit 31 outputs the data to the communication control unit 33. When reception data is output from the downlink-signal-baseband processing unit 34, the high-order-layer processing unit 31 executes processing based on the reception data. For example, in the automatic drive of the automobile, when detecting occurrence of heavy braking, abrupt steering, or the like based on outputs from various sensors provided in the automobile, the high-order-layer processing unit 31 detects occurrence of ultralow delay data to be transmitted to the base station 20. The high-order-layer processing unit 31 outputs information indicating a state of the automobile (for example, a position, speed, and a moving direction of the automobile) to the communication control unit 33 as the ultralow delay data. The high-order-layer processing unit 31 controls a brake, a steering wheel, and the like of the automobile based on states of other automobiles included in the reception data output from the downlink-signal-baseband processing unit 34.

When the ultralow delay data is output from the high-order-layer processing unit 31, the communication control unit 33 notifies the occurrence of the ultralow delay data to the transmission-request transmitting unit 35 and outputs the ultralow delay data output from the high-order-layer processing unit 31 to the uplink-signal-baseband processing unit 36. When data other than the ultralow delay data such as large volume data is output from the high-order-layer processing unit 31, the communication control unit 33 outputs the data to the uplink-signal-baseband processing unit 36.

When the occurrence of the ultralow delay data is notified from the communication control unit 33, the transmission-request transmitting unit 35 creates an L-SR. The transmission-request transmitting unit 35 disposes the created L-SR in a resource designated by the transmission request information output from the control-signal processing unit 32 in the nearest subframe 40. The transmission-request transmitting unit 35 outputs, to the radio unit 37, a signal in which the L-SR is disposed in the resource designated by the transmission request information. Consequently, the L-SR is disposed in the resource designated by the transmission request information and transmitted to the base station 20.

The table retaining unit 39 retains, for example, the allocation table 50 illustrated in FIG. 3. When allocation information is output from the control-signal processing unit 32, the uplink-signal-baseband processing unit 36 refers to the allocation table 50 in the table retaining unit 39 and specifies a ratio of an uplink signal and a downlink signal in each subframe 40. When data other than the ultralow delay data is output from the communication control unit 33, the uplink-signal-baseband processing unit 36 performs processing such as encoding and modulation on the data. The uplink-signal-baseband processing unit 36 disposes a signal after the processing in a resource of an uplink signal allocated to the terminal 30 in each subframe 40. The uplink-signal-baseband processing unit 36 outputs, to the radio unit 37, a signal in which the data other than the ultralow delay data is disposed in the resource of the uplink signal allocated to the terminal 30. Consequently, the data other than the ultralow delay data is transmitted to the base station 20 using the resource of the uplink signal. When a CQI is output from the downlink-signal-baseband processing unit 34, the uplink-signal-baseband processing unit 36 disposes information indicating the CQI in the region 45 of the UL_CTL and outputs the information to the radio unit 37. Consequently, the information indicating the CQI is transmitted to the base station 20 using a resource of the UL_CTL.

When a switching instruction is output from the control-signal processing unit 32, the uplink-signal-baseband processing unit 36 performs, according to an MCS included in the switching instruction, processing such as encoding and modulation of the ultralow delay data output from the communication control unit 33. The uplink-signal-baseband processing unit 36 adjusts, according to a transmission power value included in the switching instruction output from the control-signal processing unit 32, transmission power of the ultralow delay data on which the processing such as encoding and modulation is performed. The uplink-signal-baseband processing unit 36 disposes the ultralow delay data, the transmission power of which is adjusted, in a resource designated by the switching instruction. The uplink-signal-baseband processing unit 36 outputs, to the radio unit 37, a signal in which the ultralow delay data is disposed in the resource designated by the switching instruction. Consequently, the ultralow delay data is transmitted to the base station 20 using the resource designated by the switching instruction. When a suspension instruction is output from the control-signal processing unit 32, the uplink-signal-baseband processing unit 36 suspends transmission of data scheduled to be transmitted in the resource designated by the suspension instruction.

[Operation of the Base Station 20]

Figure 9:
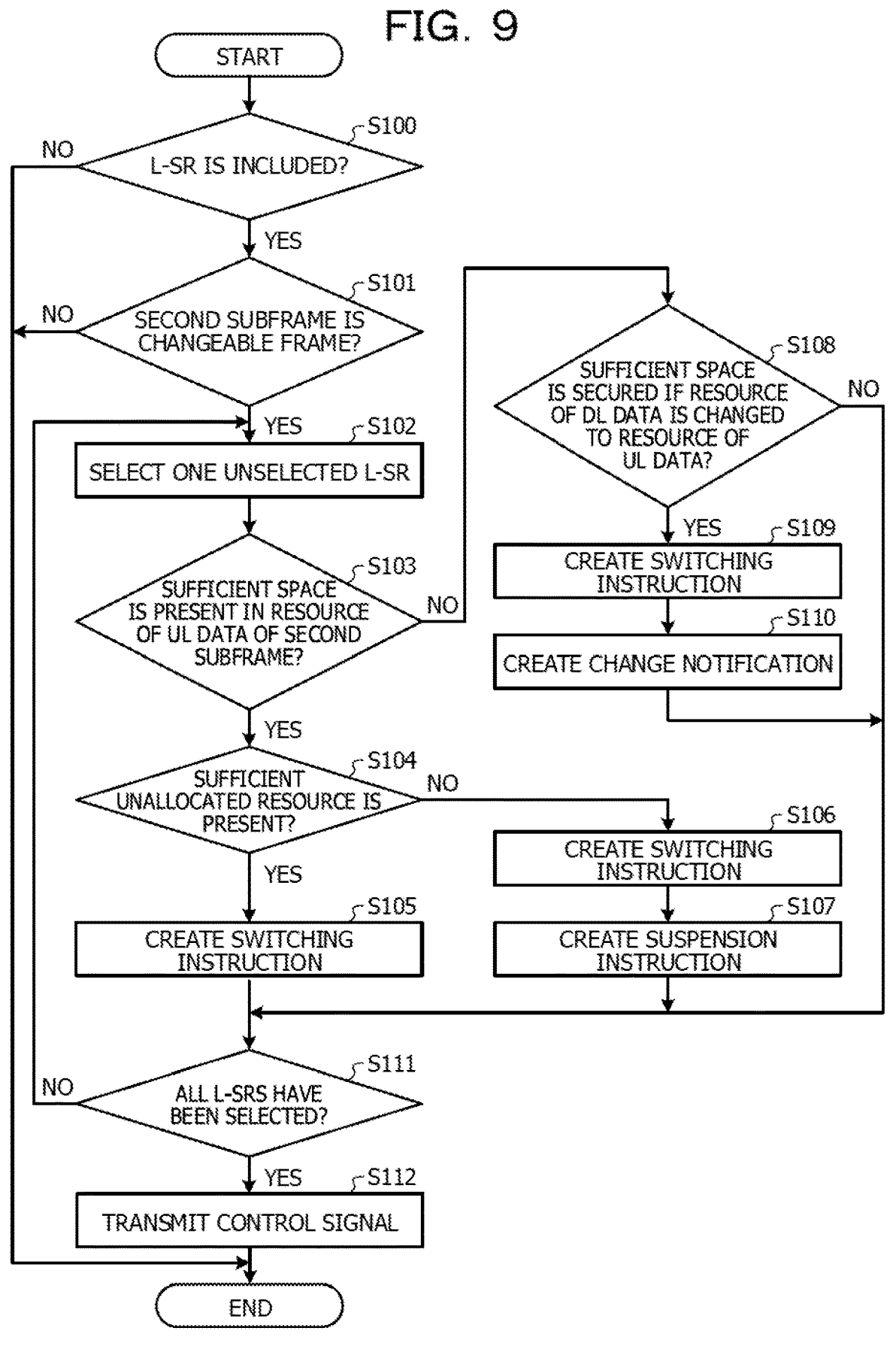
FIG. 9 is a flowchart illustrating an example of the operation of the base station.

FIG. 9 is a flowchart illustrating an example of the operation of the base station 20. The base station 20 executes operation illustrated in the flowchart of FIG. 9 for each of the subframes 40. In this flowchart, the operation of the base station 20 during reception of ultralow delay data is illustrated.

First, the scheduler 25 determines whether an L-SR is included in the region 45 where the UL_CTL in the subframe 40 is disposed (S100). When an L-SR is not included in the region 45 (S100: No), the base station 20 ends the operation illustrated in this flowchart.

On the other hand, when an L-SR is included in the region 45 where the UL_CTL is disposed (S100: Yes), the scheduler 25 specifies, as the second subframe 40, for example, the subframe 40 two subframes after the subframe 40 to which the L-SR is transmitted. The scheduler 25 determines whether the second subframe 40 is a changeable subframe 40 (S101). When the second subframe 40 is not the changeable subframe 40 (S101: No), the base station 20 ends the operation illustrated in this flowchart. Note that, when the subframe 40 two subframes after the subframe 40 to which the L-SR is transmitted is not the changeable subframe 40, the scheduler 25 may specify, as the second subframe 40, the subframe 40 three or more subframes after the subframe 40 to which the L-SR is transmitted.

When the second subframe 40 is the changeable subframe 40 (S101: Yes), the scheduler 25 extracts L-SRs from the region 45 in the subframe 40. The scheduler 25 selects one unselect L-SR out of the extracted L-SRs (S102). Note that a plurality of L-SRs transmitted from each terminal 30 are sometimes included in the region 45 in the subframe 40.

Subsequently, the scheduler 25 determines whether a space sufficient for disposing the ultralow delay data is present in a resource in the region 44 where UL data is disposed in the second subframe 40 (S103). Note that, when a resource for other ultralow delay data is already allocated to the region 44, the scheduler 25 determines whether a space sufficient for disposing the ultralow delay data is present in a resource of the region 44 not allocated for the ultralow delay data. When the sufficient space is present in the resource in the region 44 (S103: Yes), the scheduler 25 determines whether an unallocated resource sufficient for transmission of the ultralow delay data is present in the resource in the region 44 (S104).

When an unallocated resource sufficient for the transmission of the ultralow delay data is present in the region 44 (S104: Yes), the scheduler 25 allocates a resource for the ultralow delay data to the terminal 30 at the transmission source of the L-SR selected in step S102 in the region 44. The scheduler 25 creates a switching instruction including, for example, an instruction for switching the resource in the second subframe 40 to the resource for the ultralow delay data (S105) and executes processing illustrated in step S111.

On the other hand, when an unallocated resource sufficient for the transmission of the ultralow delay data is absent in the region 44 (S104: No), the scheduler 25 executes processing explained below. That is, the scheduler 25 allocates a resource in the region 44, which is already allocated to transmission of the data other than the ultralow delay data, to the resource for the ultralow delay data from the terminal 30 at the transmission source of the L-SR selected in step S102. The scheduler 25 creates a switching instruction including, for example, an instruction for switching the resource in the second subframe 40 to the resource for the ultralow delay data (S106). The scheduler 25 creates a suspension instruction for instructing suspension of the transmission of the data to the terminal 30 to which the resource being switched to the resource for the ultralow delay data is allocated (S107) and executes the processing illustrated in S111.

On the other hand, when a space sufficient for disposing the ultralow delay data is absent in the region 44 where the UL data is disposed in the second subframe 40 (S103: No), the scheduler 25 executes processing explained below. That is, the scheduler 25 determines whether a sufficient space is secured if the resource in the region 42 of the DL data is changed to a resource for the UL data (S108). When the sufficient space is not secured even if the resource in the region 42 of the DL data is changed to the resource for the UL data (S108: No), the scheduler 25 executes the processing illustrated in step S111. Note that, when the sufficient space is not secured even if the resource in the region 42 of the DL data is changed to the resource for the UL data, a resource for the ultralow delay data corresponding to the L-SR selected in step S102 is not secured. However, when the resource for the ultralow delay data corresponding to the L-SR is not secured, the terminal 30 retransmits the L-SR. Therefore, the resource for the ultralow delay data corresponding to the L-SR is secured before long.

On the other hand, when the sufficient space is secured if the resource in the region 42 of the DL data is changed to the resource for the UL data (S108: Yes), the scheduler 25 allocates at least a part of resources in the region 42 of the DL data to the resource for the ultralow delay data. The scheduler 25 creates a switching instruction including, for example, an instruction for switching the resource in the second subframe 40 to the resource for the ultralow delay data (S109). The scheduler 25 creates a change notification indicating that the resource in the region 42 of the DL data is changed to the resource for the ultralow delay data (S110).

Subsequently, the scheduler 25 determines whether all L-SRs in the region 45 of the UL_CTL of the subframe 40 have been selected (S111). When an unselected L-SR is present (S111: No), the scheduler 25 executes the processing illustrated in step S102. On the other hand, when all the L-SRs have been selected (S111: Yes), the scheduler 25 transmits the created switching instruction, the created suspension instruction, and the created change notification to the control-signal generating unit 23.

The control-signal generating unit 23 creates a control signal including the switching instruction and the suspension instruction and transmits the created control signal to each terminal 30 via the radio unit 27 using a channel such as the PDCCH (S112). The control-signal generating unit 23 creates a control signal including the change notification and transmits the created control signal to each terminal 30 via the radio unit 27 using a channel such as the BCH (S112). The base station 20 ends the operation illustrated in this flowchart.

[Operation of the Terminal 30]

Figure 10:
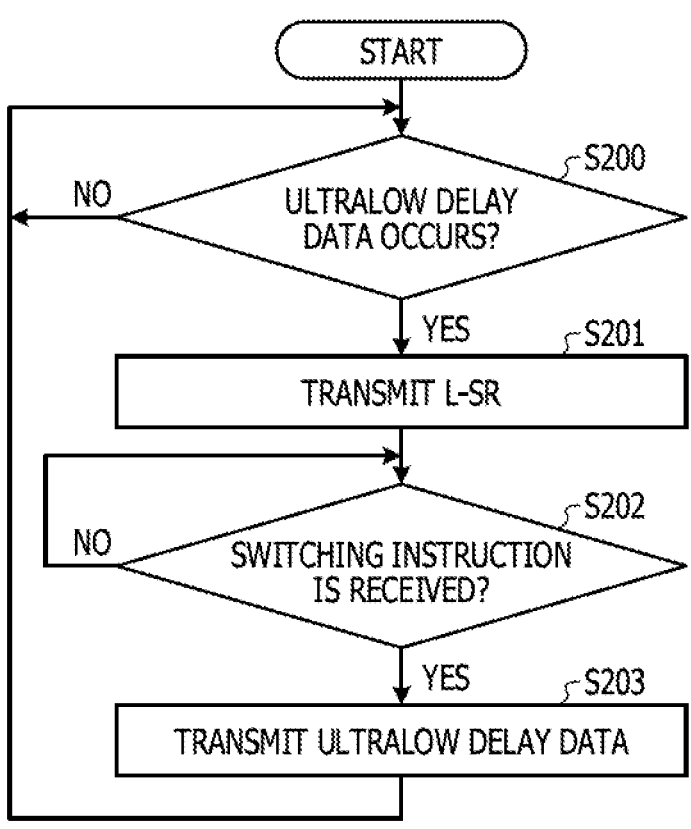
FIG. 10 is a flowchart illustrating an example of the operation of the terminal.

FIG. 10 is a flowchart illustrating an example of the operation of the terminal 30. In the flowchart illustrated in FIG. 10, the operation of the terminal 30 in transmission of ultralow delay data is illustrated.

First, the high-order-layer processing unit 31 determines, based on signals output from the sensors, whether ultralow delay data occurs (S200). When ultralow delay data does not occur (S200: No), the high-order-layer processing unit 31 executes processing illustrated in S200 again.

On the other hand, when ultralow delay data occurs (S200: Yes), the high-order-layer processing unit 31 outputs the ultralow delay data to the communication control unit 33. The communication control unit 33 notifies the occurrence of the ultralow delay data to the transmission-request transmitting unit 35 and outputs the ultralow delay data to the uplink-signal-baseband processing unit 36.

The transmission-request transmitting unit 35 creates an L-SR and disposes the created L-SR in a resource designated by transmission request information output from the control-signal processing unit 32 in the nearest subframe 40. The transmission-request transmitting unit 35 outputs, to the radio unit 37, a signal in which the L-SR is disposed in the resource designated by the transmission request information. Consequently, the L-SR is disposed in the resource designated by the transmission request information and transmitted to the base station 20 (S201).

Subsequently, the control-signal processing unit 32 refers to a control signal output from the downlink-signal-baseband processing unit 34 and determines whether a switching instruction is received (S202). When a switching instruction is received (S202: Yes), the control-signal processing unit 32 outputs the switching instruction to the uplink-signal-baseband processing unit 36. The uplink-signal-baseband processing unit 36 disposes the ultralow delay data output from the communication control unit 33 in a resource designated by the switching instruction output from the control-signal processing unit 32. The uplink-signal-baseband processing unit 36 outputs, to the radio unit 37, a signal in which the ultralow delay data output from the communication control unit 33 is disposed in the resource designated by the switching instruction. Consequently, the ultralow delay data is transmitted to the base station 20 using the resource designated by the switching instruction (S203). The high-order-layer processing unit 31 executes processing illustrated in step S200 again.

[Operation of the Wireless Communication System 10]

Figure 11:
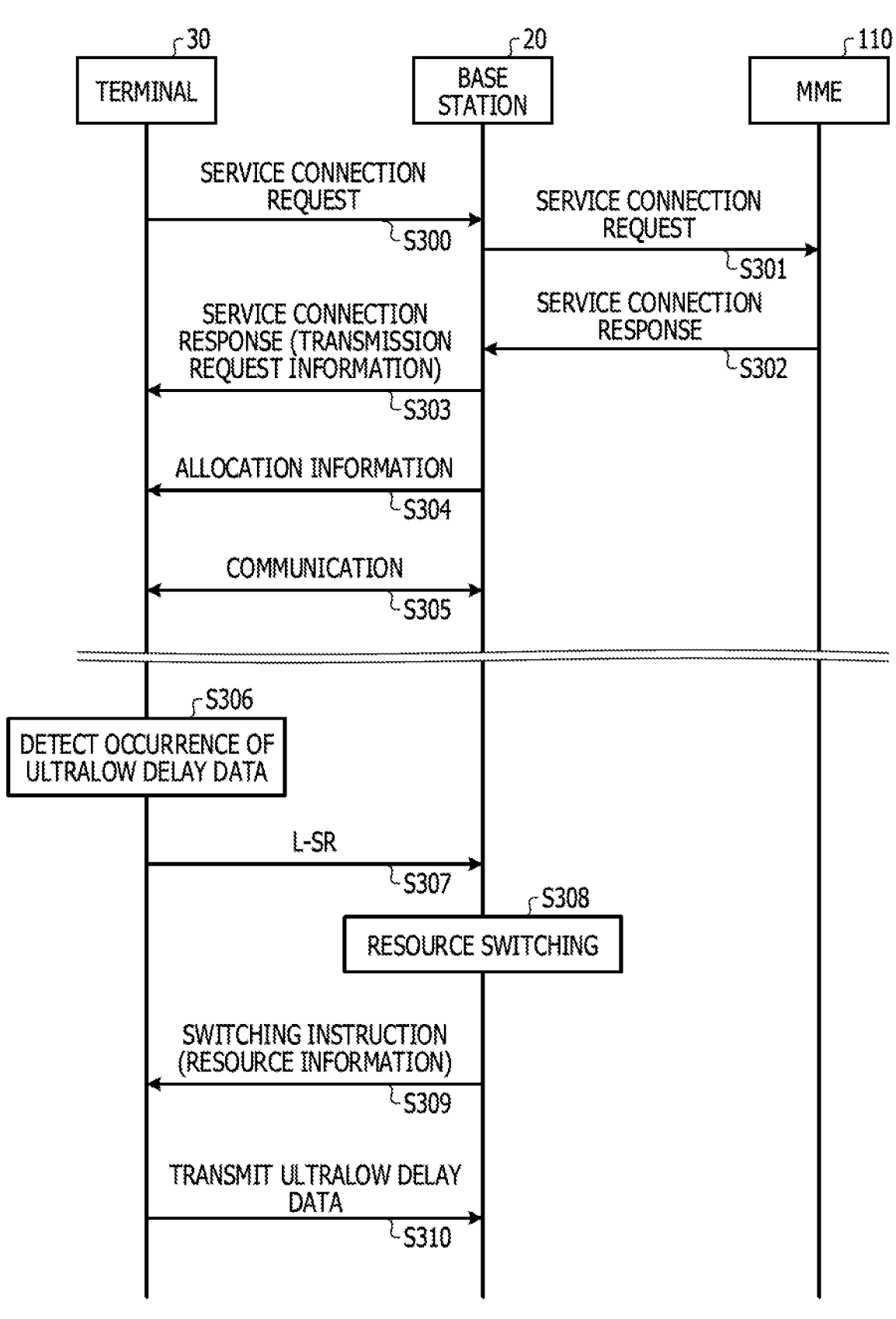
FIG. 11 is a sequence chart illustrating an example of the operation of the wireless communication system.

FIG. 11 is a sequence chart illustrating an example of the operation of the wireless communication system 10.

First, the terminal 30 transmits, according to, for example, power-on or operation of a service start by a user, a service connection request for requesting a service for treating ultralow delay data to the base station 20 (S300). The base station 20 transfers the service connection request received from the terminal 30 to the MME 110 in the core network 11 (S301). The MME 110 determines, for example, based on subscriber information and billing information, propriety of provision of the service for treating the ultralow delay data. When permitting the provision of the service for treating the ultralow delay data, the MME 110 transmits, to the base station 20, a service connection response including information to the effect that the provision of the service is permitted and information such as a delay condition requested to the service (S302). The base station 20 transmits, to the terminal 30, the service connection response including the information to the effect that the provision of the service for treating the ultralow delay data is permitted and transmission request information for instructing resources used for transmission of the ultralow delay data (S303).

Subsequently, the base station 20 determines, based on communication traffic between the base station 20 and the terminal 30, for each of the frames, a ratio of an uplink signal and a downlink signal concerning each subframe 40 included in the frame. The base station 20 notifies allocation information indicating a combination of determined ratios to each terminal 30 using a channel such as the BCH (S304). Concerning data other than the ultralow delay data such as large volume data, the base station 20 and the terminal 30 transmit and receive the data using resources of the uplink signal and the downlink signal allocated according to the allocation information (S305).

When detecting occurrence of ultralow delay data (S306), the terminal 30 transmits an L-SR to the base station 20 using the resource instructed by the transmission request information received in step S303 (S307). When receiving the L-SR from the terminal 30, the base station 20 detects the occurrence of the ultralow delay data in the terminal 30. If, for example, the second subframe 40 two subframes after the subframe 40 to which the L-SR is transmitted is a changeable subframe 40, the base station 20 switches the region 44 of the UL data in the second subframe 40 to the resource for the ultralow delay data (S308). The base station 20 transmits, to the terminal 30, using a channel such as the PDCCH, a switching instruction for instructing switching of the region 44 of the UL data in the second subframe 40 to the resource for the ultralow delay data (S309). Resource information for instructing resources used for transmission of the ultralow delay data is included in the switching instruction. Information such as the subframe 40, a frequency, time, an MCS, and transmission power used for the transmission of the ultralow delay data is included in the resource information.

When receiving the switching instruction, the terminal 30 performs processing such as encoding and modulation of the ultralow delay data according to the MCS and a transmission power value included in the switching instruction and adjusts transmission power of a signal after the processing. The terminal 30 disposes the ultralow delay data, the transmission power of which is adjusted, in the resource designated by the switching instruction and transmits the ultralow delay data to the base station 20 (S310).

[Hardware]

Figure 12:
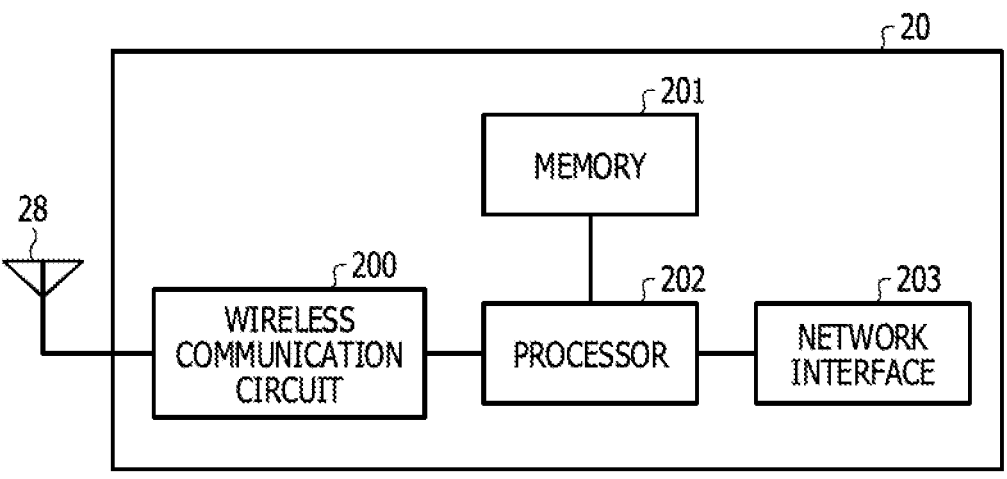
FIG. 12 illustrates an example of hardware of the base station.

FIG. 12 illustrates an example of hardware of the base station 20. The base station 20 includes, for example, as illustrated in FIG. 12, a wireless communication circuit 200, a memory 201, a processor 202, a network interface 203, and the antenna 28.

The wireless communication circuit 200 applies predetermined processing such as modulation to a signal output from the processor 202 and transmits a transmission signal after the processing via the antenna 28. The wireless communication circuit 200 applies predetermined processing such as demodulation to a reception signal received via the antenna 28 and outputs the reception signal to the processor 202. The wireless communication circuit 200 realizes, for example, the function of the radio unit 27. The network interface 203 is an interface for connecting the base station 20 to the core network 11 through wired connection.

Programs and the like for realizing the functions of the QoS control unit 21, the resource allocating unit 22, the control-signal generating unit 23, the allocation-information control unit 24, the scheduler 25, and the uplink-signal-baseband processing unit 26 are stored in the memory 201. Data and the like in the table retaining unit 29 are stored in the memory 201. The processor 202 reads out the programs from the memory 201 and executes the programs to thereby realize, for example, the functions of the QoS control unit 21, the resource allocating unit 22, the control-signal generating unit 23, the allocation-information control unit 24, the scheduler 25, and the uplink-signal-baseband processing unit 26.

Note that not all of the programs in the memory 201 have to be stored in the memory 201 from the beginning. For example, the programs may be stored in a portable recording medium such as a memory card inserted into the base station 20. The base station 20 may acquire the programs of a portion used for processing from such a portable recording medium and execute the programs. The base station 20 may acquire the programs from another computer, a server apparatus, or the like, in which the programs are stored, via a wireless communication line, a public line, the Internet, a LAN, a WAN, or the like and execute the programs.

Figure 13:
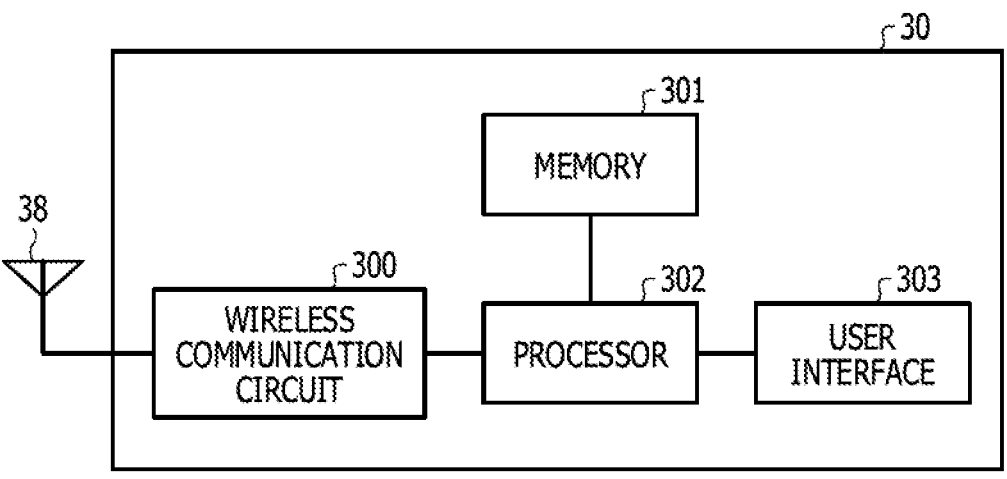
FIG. 13 illustrates an example of hardware of the terminal.

FIG. 13 illustrates an example of hardware of the terminal 30. The terminal 30 includes, for example, as illustrated in FIG. 13, a wireless communication circuit 300, a memory 301, a processor 302, a user interface 303, and the antenna 38.

The wireless communication circuit 300 applies predetermined processing such as modulation to a signal output from the processor 302 and transmits a transmission signal after the processing via the antenna 38. The wireless communication circuit 300 applies predetermined processing such as demodulation to a reception signal received via the antenna 38 and outputs the reception signal to the processor 302. The wireless communication circuit 300 realizes, for example, the function of the radio unit 37. The user interface 303 includes an input device that receives operation from the user of the terminal 30 and a display device that displays a processing result.

Programs and the like for realizing the functions of the high-order-layer processing unit 31, the control-signal processing unit 32, the communication control unit 33, the downlink-signal-baseband processing unit 34, the transmission-request transmitting unit 35, and the uplink-signal-baseband processing unit 36 are stored in the memory 301. Data and the like in the table retaining unit 39 are stored in the memory 301. The processor 302 reads out programs from the memory 301 and executes the programs to realize the functions of the high-order-layer processing unit 31, the control-signal processing unit 32, the communication control unit 33, the downlink-signal-baseband processing unit 34, the transmission-request transmitting unit 35, and the uplink-signal-baseband processing unit 36.

Note that not all of the programs in the memory 301 have to be stored in the memory 301 from the beginning. For example, the programs may be stored in a portable recording medium such as a memory card inserted into the terminal 30. The terminal 30 may acquires the programs of a portion used for processing from such a portal recording medium and execute the programs. The terminal 30 may acquire the programs from another computer, a server apparatus, or the like, in which the programs are stored, via a wireless communication line, a public line, the Internet, a LAN, a WAN, or the like and execute the programs.

[Effects of the Embodiment]

As explained above, the base station 20 in this embodiment is the base station 20 that switches an uplink signal and a downlink signal in a time division manner between the base station 20 and the terminal 30. The base station 20 includes the control-signal generating unit 23 and the scheduler 25. The control-signal generating unit 23 notifies, to the terminal 30, allocation information for designating, for communication using data other than the ultralow delay data such as large volume data, allocation of resources of the uplink signal and the downlink signal for each of a continuous predetermined number of subframes 40. When detecting occurrence of ultralow delay data, the scheduler 25 creates a switching instruction including an instruction for switching a part of the resources of the uplink signal and the downlink signal designated by the allocation information to a resource for the ultralow delay data. The control-signal generating unit 23 notifies the switching instruction created by the scheduler 25 to the terminal 30. Consequently, the base station 20 can satisfy a delay requested to transmission of the ultralow delay data while maintaining transmission efficiency of large volume data.

In this embodiment, an uplink period used for an uplink signal and a downlink period used for a downlink signal are included in each subframe 40. Concerning each subframe 40, information indicating the lengths of the uplink period and the downlink period included in the subframe 40 is included in the allocation information. The scheduler 25 creates a switching instruction for switching at least a part of resources in the uplink period or the downlink period indicated by the allocation information to a resource for the ultralow delay data in the subframe 40 after the occurrence of the ultralow delay data is detected. Consequently, in each subframe 40, an L-SR for requesting transmission of the ultralow delay data can be transmitted to the base station 20. A delay from the occurrence of the ultralow delay data to the transmission of the L-SR can be reduced to a delay equal to or shorter than a time length of one subframe 40. Therefore, it is possible to quickly request the base station 20 to transmit the ultralow delay data.

In this embodiment, when receiving an L-SR from the terminal 30 in the uplink period included in any subframe 40, the scheduler 25 detects the occurrence of the ultralow delay data. The scheduler 25 creates a switching instruction for switching at least a part of resources in the uplink period into a resource for the ultralow delay data in the second subframe 40 after the first subframe 40 in which the L-SR is received. The control-signal generating unit 23 transmits the switching instruction to the terminal 30 at the transmission source of the L-SR. Consequently, the terminal 30 can quickly transmit the ultralow delay data occurred in the terminal 30 to the base station 20.

In this embodiment, when the scheduler 25 creates the switching instruction for switching at least a part of the resources in the uplink period to the resource for the ultralow delay data, the scheduler 25 creates a suspension instruction for instructing transmission suspension of the uplink signal when the part of the resources is already allocated to an uplink signal of another terminal 30. The control-signal generating unit 23 notifies the suspension instruction created by the scheduler 25 to the other terminal 30 to which the resource before being switched to the resource for the ultralow delay data is allocated. Consequently, it is possible to avoid collision of the ultralow delay data and data transmitted from the other terminal 30.

In this embodiment, when the resources in the uplink period are fewer than resources for the ultralow delay data in the second subframe 40, the scheduler 25 creates a switching instruction for switching at least a part of resources in the downlink period included in the second subframe 40 to a resource for the ultralow delay data. The scheduler 25 creates a change notification for notifying that the resource in the downlink period of the second subframe 40 is changed to the resource for the ultralow delay data. The control-signal generating unit 23 transmits the switching instruction to the terminal 30 at the transmission source of the L-SR and notifies the change notification to the terminal 30. Consequently, each terminal 30 can exclude, from a measurement target of the quality of a channel, the subframe 40 changed to the resource for the ultralow delay data and can stop deterioration in measurement accuracy of the quality of the channel.

In this embodiment, the terminal 30 is the terminal 30 that switches an uplink signal and a downlink signal in a time division manner between the terminal 30 and the base station 20 and performs communication. The terminal 30 includes the control-signal processing unit 32, the downlink-signal-baseband processing unit 34, and the uplink-signal-baseband processing unit 36. The downlink-signal-baseband processing unit 34 and the uplink-signal-baseband processing unit 36 perform communication with the base station 20 based on the allocation information notified from the base station 20. The control-signal processing unit 32 receives, from the base station 20, a switching instruction including an instruction for switching a part of resources of an uplink signal or a downlink signal designated by the allocation information to a resource for the ultralow delay data. When the control-signal processing unit 32 receives the switching instruction, the uplink-signal-baseband processing unit 36 performs transmission of the ultralow delay data using the resource after the switching according to the switching instruction. Consequently, the terminal 30 can satisfy a delay requested to the transmission of the ultralow delay data while maintaining transmission efficiency of large volume data.

In this embodiment, the terminal 30 includes the high-order-layer processing unit 31 and the transmission-request transmitting unit 35. The high-order-layer processing unit 31 detects occurrence of ultralow delay data. When the occurrence of the ultralow delay data is detected by the high-order-layer processing unit 31, the transmission-request transmitting unit 35 transmits an L-SR to the base station 20 in the uplink period of the subframe 40 after the occurrence of the ultralow delay data is detected. Consequently, the terminal 30 can quickly transmit the ultralow delay data occurred in the terminal 30 to the base station 20.

In this embodiment, when receiving the suspension instruction from the base station 20, the uplink-signal-baseband processing unit 36 suspends transmission of data other than the ultralow delay data in the uplink period. Consequently, it is possible to avoid collision of data transmitted from the terminal 30 and the ultralow delay data transmitted from another terminal 30.

In this embodiment, the downlink-signal-baseband processing unit 34 measures, based on the allocation information, the quality of the channel between the terminal 30 and the base station 20 based on a reference signal transmitted in the downlink period of each subframe 40. When receiving the change notification from the base station 20, the downlink-signal-baseband processing unit 34 excludes, from the measurement target of the quality of the channel, the subframe 40 in which the resource in the downlink period is changed to the resource for the ultralow delay data. Consequently, each terminal 30 can stop deterioration in measurement accuracy of the quality of the channel.

[Others]

Note that the disclosed technique is not limited to the embodiment explained above. Various modifications are possible within the range of the gist of the disclosed technique.

For example, in the embodiment explained above, the base station 20 includes, in the switching instruction, the information concerning the resources such as the MCS used for the transmission of the ultralow delay data and transmits the information to the terminal 30. However, the disclosed technique is not limited to this. For example, the base station 20 may notify a part of the information concerning the resources such as the MCS used for the transmission of the ultralow delay data to each terminal 30 in advance and include, in the switching instruction, the remainder of the information concerning the resources used for the transmission of the ultralow delay data and transmit the remainder of the information to the terminal 30.

For example, the control-signal generating unit 23 notifies, to each terminal 30, transmission request information for designating resources used for transmitting the L-SR in each subframe 40 and designation information for designating at least a part of information for specifying resources used for the transmission of the ultralow delay data. When the L-SR is transmitted, the control-signal generating unit 23 notifies, to the terminal 30 at the transmission source of the L-SR, the remainder of the information for specifying the resources used for the transmission of the ultralow delay data.

The control-signal processing unit 32 of the terminal 30 receives the transmission request information and the designation information notified from the base station 20. When the occurrence of the ultralow delay data is detected by the high-order-layer processing unit 31, the uplink-signal-baseband processing unit 36 creates a first transmission signal including the ultralow delay data according to the designation information notified from the base station 20. When the occurrence of the ultralow delay data is detected by the high-order-layer processing unit 31, the transmission-request transmitting unit 35 transmits a transmission request to the base station 20 using a resource designated by the transmission request information. The remainder of the information for specifying the resources used for the transmission of the ultralow delay data is included in the switching instruction. When receiving the switching instruction from the base station 20, the uplink-signal-baseband processing unit 36 creates a second transmission signal from the first transmission signal according to information included in the switching instruction and transmits the created second transmission signal to the base station 20.

For example, the control-signal generating unit 23 of the base station 20 includes, in the transmission request information, for example, information concerning a MCS and a transmission power value as at least a part of the information for specifying the resources used for the transmission of the ultralow delay data. When the L-SR is transmitted, the control-signal generating unit 23 includes, in the switching instruction, information concerning a frequency and time as the remainder of the information for specifying the resources used for the transmission of the ultralow delay data.

When the occurrence of the ultralow delay data is detected by the high-order-layer processing unit 31, the uplink-signal-baseband processing unit 36 of the terminal 30 executes processing such as encoding, modulation, and power adjustment on the ultralow delay data according to the instruction information notified from the base station 20 and creates the first transmission signal. When receiving the switching instruction from the base station 20, the uplink-signal-baseband processing unit 36 disposes the first transmission signal in a resource block corresponding to the frequency and the time included in the switching instruction according to the information included in the switching instruction to thereby create the second transmission signal. The second transmission signal created by the uplink-signal-baseband processing unit 36 is subjected to processing such as upconvert by the radio unit 37 and transmitted to the base station 20 as a transmission signal. Consequently, when detecting the occurrence of the ultralow delay data, the terminal 30 can execute the processing such as encoding, modulation, and power adjustment of the ultralow delay data in parallel to the transmission of the L-SR. Therefore, in the terminal 30, processing after the reception of the switching instruction from the base station 20 is reduced in the transmission of the ultralow delay data. Therefore, even if a processing ability of the terminal 30 is not so high, the terminal 30 can transmit the ultralow delay data using the resource designated by the switching instruction.

Note that any information among the information concerning the resources used for the transmission of the ultralow delay data may be included in the information notified from the base station 20 to each terminal 30 as the designation information. All the information concerning the resources used for the transmission of the ultralow delay data may be included in the information notified from the base station 20 to each terminal 30 as the designation information. However, the quality of the channel between the base station 20 and the terminal 30 fluctuates with time according to radio wave environments of the base station 20 and the terminal 30. Therefore, concerning information concerning a frequency and time for specifying a resource block among the information concerning the resources used for the transmission of the ultralow delay data, it is desirable to designate information concerning a resource block with satisfactory quality at a point in time when the switching instruction is transmitted.

For example, the base station 20 may notify candidates of the resources such as the MCS used for the transmission of the ultralow delay data to each terminal 30 in advance and, when transmitting the switching instruction, designate resources used for the transmission of the ultralow delay data among the candidates.

For example, the control-signal generating unit 23 of the base station 20 notifies, to each terminal 30, transmission request information for designating a resource used to transmit the L-SR in each subframe 40 and designation information for designating candidates of a plurality of resources used for the transmission of the ultralow delay data. When the L-SR is transmitted from the terminal 30, the control-signal generating unit 23 notifies, to the terminal 30 at the transmission source of the L-SR, information for specifying resources used for the transmission of the ultralow delay data among the candidates.

The control-signal processing unit 32 of the terminal 30 receives the transmission request information and the designation information notified from the base station 20. When the occurrence of the ultralow delay data is detected by the high-order-layer processing unit 31, the uplink-signal-baseband processing unit 36 creates, according to the designation information notified from the base station 20, a transmission signal including the ultralow delay data for each of the candidates of the resources used for the transmission of the ultralow delay data. When the occurrence of the ultralow delay data is detected by the high-order-layer processing unit 31, the transmission-request transmitting unit 35 transmits a transmission request to the base station 20 using resources designated by the transmission request information. Information for specifying the resources used for the transmission of the ultralow delay data among the candidates of the resources used for the transmission of the ultralow delay data is included in the switching instruction. When receiving the switching instruction from the base station 20, the uplink-signal-baseband processing unit 36 transmits, to the base station 20, a transmission signal for using the resources specified by the information included in the switching instruction.

Consequently, when detecting the occurrence of the ultralow delay data, the terminal 30 can start, in parallel to the transmission of the L-SR, creation of a transmission signal for each of the candidates of the resources used for the transmission of the ultralow delay data. Therefore, when receiving the switching instruction from the base station 20, the terminal 30 can select, out of created transmission signals, a transmission signal for using the resources specified by the information included in the switching instruction and transmits the transmission signal to the base station 20. Consequently, even if a processing ability of the terminal 30 is not so high, the terminal 30 can transmit the ultralow delay data using the resources designated by the switching instruction.

Note that, in the embodiment explained above, a transmission procedure in the case in which the ultralow delay data occurs in the terminal 30 is explained. However, the disclosed technique is not limited to this. For example, the disclosed technique can also be applied when the ultralow delay data occurs in the base station 20.

In the embodiment explained above, the processing blocks respectively included in the base station 20 and the terminal 30 are divided for the respective functions according to main processing contents in order to facilitate understanding of the base station 20 and the terminal 30 in the embodiment. Therefore, the disclosed technique is not limited by a method of dividing the processing blocks and names of the processing blocks. The processing blocks included in the base station 20 and the terminal 30 in the embodiment explained above can be further subdivided into a larger number of processing blocks according to processing content. A plurality of processing blocks can be integrated into one processing block. The processing executed by the respective processing block may be realized as processing by software or may be realized by dedicated hardware such as an ASIC (Application Specific Integrated Circuit).

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that the various changes, substitutions, and alterations could be made hereto without departing from the spirit and scope of the disclosure.

What is claimed is:

1. A terminal comprising:

a transmitter configured to transmit an uplink signal;

a receiver configured to:

receive information indicating allocation information used for communication with a base station from among a plurality of pieces of allocation information, each of the plurality of pieces of allocation information indicating a combination of resources for time division duplex (TDD) of uplink (UL) or downlink (DL) configuration at a predetermined interval; and processor circuitry configured to, in a case where a first uplink signal is scheduled to be transmitted to the base station via a first resource among the resources for the UL configuration, control the transmitter not to transmit to the base station, via the first resource, the first uplink signal that has been scheduled to be transmitted to the base station via the first resource, in response to the receiver receiving control information indicating to cancel transmission of the first uplink signal that has been scheduled to be transmitted to the base station via the first resource, wherein the plurality of pieces of allocation information include:

first allocation information that does not include the UL configuration; and second allocation information that does not include the DL configuration.

2. The terminal according to claim 1, wherein the transmitter is configured to transmit a first allocation request for the first uplink signal or a second allocation request for a second uplink data signal, the second uplink signal has a higher delay requirement than the first uplink signal.

3. The terminal according to claim 2, wherein the first allocation request of resource is allocated a first cycle, the second allocation request of resource is allocated a second cycle, the second cycle is shorter than the first cycle.

4. The terminal according to claim 2, wherein the transmitter transmits the second allocation request when the second signal is occurred.

5. The terminal according to claim 1, wherein the plurality of pieces of allocation information includes first allocation information, second allocation information, and third allocation information, the first allocation information does not include UL period at the predetermined interval, the second allocation information does not include DL period at the predetermined interval, and the third allocation information does not include the UL period and the DL period at the predetermined interval.

6. The terminal according to claim 1, wherein the receiver receives allocation information allocated for two or more predetermined intervals.

7. The terminal according to claim 6, wherein each of the two or more predetermined intervals correspond to one of a predetermined number of subframes.

8. The terminal according to claim 7, wherein the receiver receives change information for changing an allocation ratio of resources of uplink and downlink signals.

9. The terminal according to claim 1, wherein the transmitter is configured to transmit a first allocation request for the first uplink signal and a second allocation request for a second uplink-data signal, the second uplink signal has a higher delay requirement than the first uplink signal.

* * * * *